Patented Aug. 19, 1941

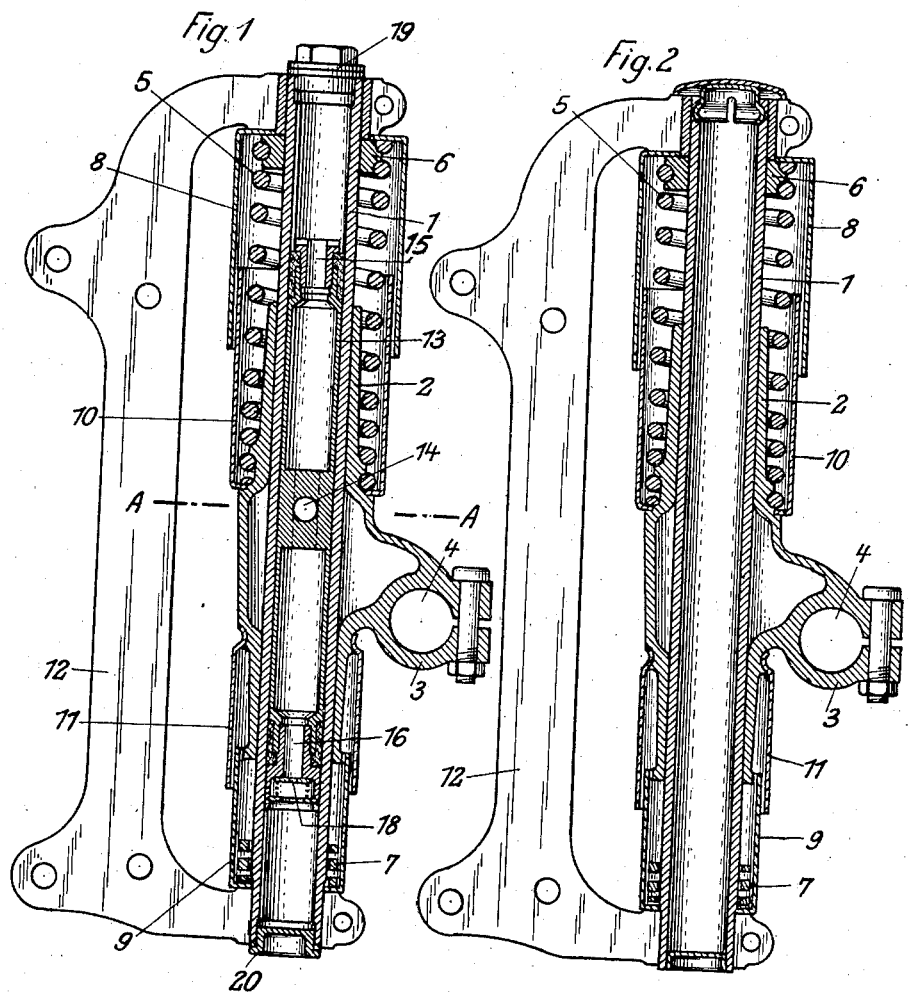

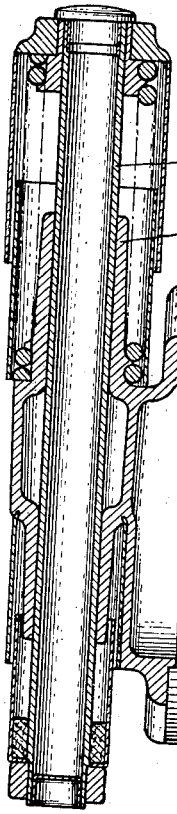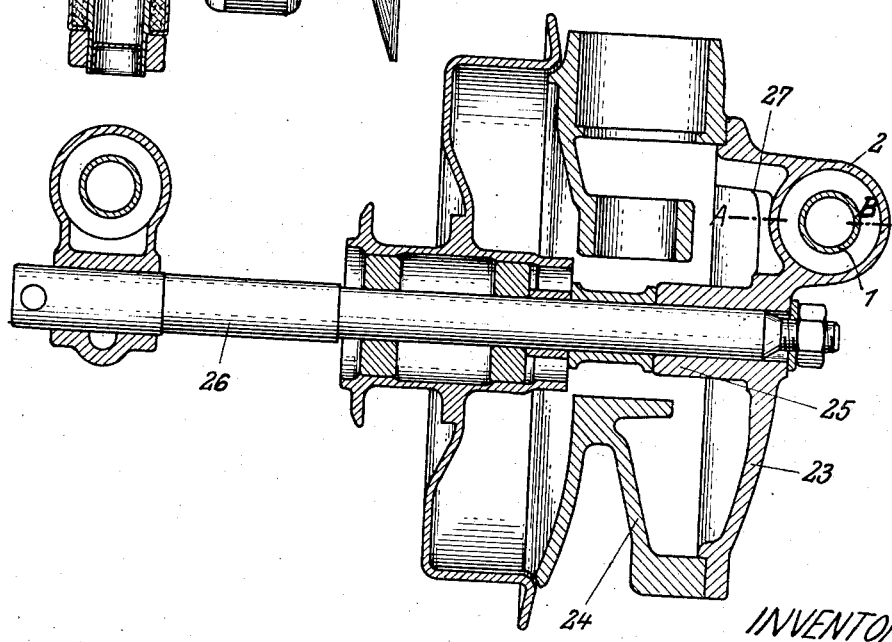

2,252,866

UNITED STATES PATENT OFFICE 2,252,866

REAR WHEEL SPRINGING FOR MOTOR-CYCLES

Rudolf Schleicher, Munich, Germany, assignor to the firm Bayerische Motoren Werke Aktiengesellschaft, Munich, Germany Application November 1, 1938, Serial No. 238,152
In Germany May 7, 1937

5 Claims. (Cl. 280—285)

It is already well known to resiliently mount the rear wheel of motorcycles, in order to reduce or dampen the effect of the shocks caused by unevenness of the road surface and acting upon the rear wheel, so that the driver is not excessively fatigued by reason of the continuous jerks and shocks, whilst the vital elements of the motor cycle are less strained by reason of shockless and more resilient travel. Most of the rear wheel springing systems for this purpose, and especially those with laminated springs or rocking levers or frames have failed to give satisfactory results, as it is only possible to stiffen the two rear frame ends, which are not interconnected, and to render them sufficiently rigid as to cause both wheels to run along the same track, by bulky and complicated constructions. Further, the weight of a motorcycle is considerably increased by structures of this character, so that springing systems of this type have only been applied in rare cases, while the rear springing systems consisting of springs located in cylindrical casings, have been adopted by reason of their simple design and easier application, as well as their thorough protection against weather influences.

The present invention relates to the last mentioned type of rear wheel springing systems, and has for its object a self-contained unit which can be applied, even subsequently, to motorcycles and again removed therefrom. For this purpose spring actuated sleeves are located on the outside of detachably fixed tubes which are connected to the rear frame ends, either directly or by means of a rigid intermediate yoke. The sliding spring-actuated sleeve forms a bearing for the rear wheel by screwing a knockout spindle into an extension cast integral with the sliding sleeve.

The rear wheel with its driving casing is supported on the knock-out spindle which also rigidly connects together the two frame ends, whereby the latter are rotatively stiffened without the necessity of reinforcing them separately on account of the spring system. Another advantage resides in the fact that the springing system is adapted to be provided as may be desired or necessary, with a shock absorber located in the fixed tube in an interchangeable way and connected with the sliding sleeve.

In a modified form of construction the spring actuated sliding sleeve may be formed integral with the cover of the rear wheel driving casing or with the said casing itself. The advantage offered by this design consists in obtaining a very inexpensive and lightweight construction, as any machining of the sliding sleeve and the bolting thereof to the cover or casing are entirely eliminated. In spite of the economy in weight, the rigidity and stiffness of the driving casing or its cover are considerably increased. As no bolting means are necessary, a neat shape of the components in question is obtained; thus the possibility of dirt deposits are decreased and cleaning operations are facilitated.

The invention is shown by way of example in the accompanying drawings, which show embodiments with and without shock absorbers.

In these drawings:

Fig. 1 is a vertical section of the device with a shock absorber;

Fig. 2 shows the same section of a device without a shock absorber;

Fig. 3 shows a cross section on the line A—A of Fig. 1;

Fig. 4 shows a partial section of a unit on the line A—B of Fig. 5, looking in the direction of the arrow; and Fig. 5 is a horizontal cross-section of the rear wheel drive.

Over a tube 1 is fitted a sliding sleeve 2 provided with an extension 3 cast integral therewith. In to the bore 4 of the extension 3 is fitted the rear wheel axle. The lower convolutions of a helical spring 5 engage with circular grooves in the sleeve 2, whilst the upper convolutions engage with grooves in a collar 6, the arrangement thus acting as a tension and compression spring. Underneath the sliding sleeve 2 is located on the tube 1 a helical spring 7, or a rubber cushion, serving as a buffer for damping the movement of the sleeve 2 in the case of excessive vibrations. For preventing the entrance of dust and moisture, the upper and lower ends of the tube 1 are provided with separate protecting sleeves 8, 9, 10, 11, the sleeve 8 sliding over the upper end of sleeve 10, and sleeve 9 fitting into the lower end of sleeve 11. The sleeves 10, 11 are secured to the sliding sleeve 2. The spring system thus described may be fitted to a motorcycle frame in two ways, (1) by inserting the tube 1 directly into each frame end, or (2) by using a strap 12, and securing it in position by means of clamping bolts. An additional dampening action is obtained by a shock absorber inserted into the tube 1, the cylinder 13 of the shock absorber being secured to the sliding sleeve 2 by means of a screw 14. The tube 1 is provided with a longitudinal slot, the length of which corresponds to the maximum length of possible movement of the screw 14. The upper and lower ends of the cylinder 13 are made sufficiently fluid-tight, whilst bores 15, 16 and 17 of suitable dimensions are provided for the passage of oil. The lower end of the cylinder 13 is also provided with a non-return valve 18, serving to damp recoils which might take place. Oil-tight plugs 19, 20 close the upper and lower ends of the fixed tube 1.

As shown in Fig. 2, the rear wheel spring system can be also used without a shock absorber. In this case, after removing the two plugs 19, 20 draining off the oil and removing the screw 14, the whole cylinder 13 can be removed easily; the tube 1 is then closed at both ends by the plugs 19, 20. The type of springing system, embodied in the design in Fig. 1, operates in the following way:

All shocks, transferred from the road surface to the rear wheel by means of the sliding sleeve 2 are transmitted to the spring 5 by which they are taken up.

The shock absorber 13 follows the upward and downward movements of the sliding sleeve, whereby the oil in the first case is forced in a downward direction through the bores 15, 16, 17 of the shock absorber, thus opening the non-return valve 18 against the action of its spring as soon as the cylinder 13 commences to move upwardly, so that the oil is allowed to flow through quicker, whilst when the shock absorber moves downwardly, the oil flow is throttled by the small bore of the valve 18 which is in the closed position. Thus a more effective damping of the recoils is obtained.

Referring now to Figs. 4 and 5, the sliding sleeve 2 is formed integrally with the driving casing cover 23 which latter is fastened to the casing 24 by bolting in a known manner.

In its central portion, the cover 23 is provided with a long cast hub extension 25, for the purpose of suitably supporting and guiding the knock-out spindle 26. The sleeve 2 is provided with stiffening webs 27, as a result of which effective stiffening on the cover 23 is obtained without modifying the neat appearance of the outer surface.

While I have herein shown and described only certain embodiments of certain features of my present invention, it is to be understood that they are to be regarded merely as illustrative, and that I do not intend to limit myself thereto except as may be required by the following claims.

I claim:

1. Spring suspension for motorcycle wheels comprising, in combination, a motorcycle frame including a pair of rearwardly extending yokes, a tube releasably, rigidly, substantially vertically mounted between each yoke, a sleeve slidably mounted on each tube, a wheel spindle interconnecting said sleeves, and a pair of helical springs, each spring interconnecting the upper end of one sleeve with the upper end of its corresponding yoke, whereby said springs act in compression and tension upon relative up and down movement of the spindle.

2. The combination according to claim 1, in combination with resilient abutment means intermediate each sleeve and the lower end of its corresponding yoke.

3. The combination according to claim 1, in combination with an axle-drive casing having one part formed integrally with one of said sleeves and the remaining parts connected to said integrally formed part.

4. The combination according to claim 1, in combination with an axle-drive casing cover formed integrally with one of said sleeves, said cover being formed with a long integral hub extension mounted upon said spindle.

5. The combination according to claim 1, in combination with cooperating relatively slidable cylindrical spring covers respectively mounted on the upper end of each sleeve and on the upper end of each yoke.

RUDOLF SCHLEICHER.